United States Patent
Chang (10) Patent No.: US 9,720,553 B2
(45) Date of Patent: Aug. 1, 2017

(54) INPUT DEVICE INCLUDING FOLD OVER SENSOR SUBSTRATE

(71) Applicant: SYNAPTICS INCORPORATED, San Jose, CA (US)

(72) Inventor: Yi-Yun Chang, Tapei (TW)

(73) Assignee: Synaptics Incorporated, San Jose, CA (US)

( * ) Notice: Subject to any disclaimer, the term of this patent is extended or adjusted under 35 U.S.C. 154(b) by 241 days.

(21) Appl. No.: 14/586,480

(22) Filed: Dec. 30, 2014

(65) Prior Publication Data
US 2016/0188047 A1    Jun. 30, 2016

(51) Int. Cl.
*G06F 3/045* (2006.01)
*G06F 3/047* (2006.01)
*G06F 3/044* (2006.01)

(52) U.S. Cl.
CPC .............. *G06F 3/047* (2013.01); *G06F 3/044* (2013.01)

(58) Field of Classification Search
CPC ......... G06F 3/044; G06F 3/047; G09G 5/003; G09G 2300/0426
USPC ................................ 345/173–175; 178/18.06
See application file for complete search history.

(56) References Cited

U.S. PATENT DOCUMENTS

| 4,450,324 | A | * | 5/1984 | Fukukura | ............. | H01H 13/702 |
| | | | | | | 200/292 |
| 2010/0300772 | A1 | * | 12/2010 | Lee | ..................... | G06F 3/03547 |
| | | | | | | 178/18.06 |
| 2011/0278078 | A1 | * | 11/2011 | Schediwy | ............... | G01L 1/146 |
| | | | | | | 178/18.06 |

* cited by examiner

*Primary Examiner* — Jimmy H Nguyen
(74) *Attorney, Agent, or Firm* — Osha Liang LLP (57) ABSTRACT

A sensor substrate for use with an input device of an electronic system includes a plurality of sensor electrodes disposed on the sensor substrate; a first segment for use with a touch pad area of the input device; and a second segment for use with a button area of the input device; wherein the touch pad area and the button area do not overlap, and further wherein the first and second segments comprise a single, contiguous sheet of material.

16 Claims, 6 Drawing Sheets

INPUT DEVICE INCLUDING FOLD OVER SENSOR SUBSTRATE

TECHNICAL FIELD

This invention generally relates to electronic devices, and more specifically relates to sensor devices and using sensor devices for producing user interface inputs.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Some input devices also have the ability to detect force applied to a sensing surface in addition to determining positional information. Both hinged and uniform clickable pads typically employ a mechanical or electronic switch, such as a rubber domed tact switch, to detect movement of the pad to perform a button click, as well as a spring mechanism to restore the pad to its original position following a button click.

Presently known clickable input pads are limited in that the area designated for button clicks tends to limit the area available for proximity sensing. In addition, multiple sensor substrates and associated connectors increase the cost and complexity of click pad modules. Devices and methods are thus needed which overcome these shortcomings.

BRIEF SUMMARY

The embodiments of the present invention provide devices and methods that improve device usability. Specifically, the device and method provide improved user interface functionality by facilitating user input with input objects using a sensor substrate including a first segment for use with a touch pad area of the input device, and a second segment for use with a button area of the input device, where the touch pad area and the button area do not overlap and the first and second segments comprise a single, contiguous sheet of material. The sensor substrate may also include a third segment for use with the button area. A processing system is configured to determine positional information for an input object interacting with either the first or the second segment, and to determine a button click for an input object interacting with the third segment. The button click, particularly when combined with the positional information, may be used to provide a wide range of user interface functionality and flexibility.

In various embodiments, an input device is assembled using a contiguous planar sensor substrate having a first region, a tab adjacent to the first region, a third region spaced apart from the first region, and a flexible rib connecting the first and third regions. The third region is folded over the tab by bending the flexible rib, so that the third region is aligned with and overlaps the tab, and a button component is placed between the third region and the tab. In this way, the third region enables two-dimensional positional sensing in the button area of the device, the tab detects a button press, and the first region facilitates two-dimensional positional sensing in the touch pad area of the input device. By starting with a single planar sensor substrate and folding it over upon itself, however, all the foregoing functions may be implemented using a single daughter board, flex tail, and connector.

BRIEF DESCRIPTION OF DRAWINGS

Preferred exemplary embodiments will hereinafter be described in conjunction with the appended drawings, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In various embodiments a click pad assembly includes a capacitive sensor substrate having three electrode segments for implementing three distinct functions: i) a first segment for use as a two-dimensional touch sensor; ii) a second segment for use as a two-dimensional button surface sensor; and iii) a third segment for use as a one dimensional button click sensor. The spatial arrangement of the sensor which allows it to be folded over upon itself into its final configuration, thereby implementing all three functions using a single sensor substrate, a single flex tail, a single daughter board, and a single electrical connector which interfaces with the host electrical system.

Figure 1:
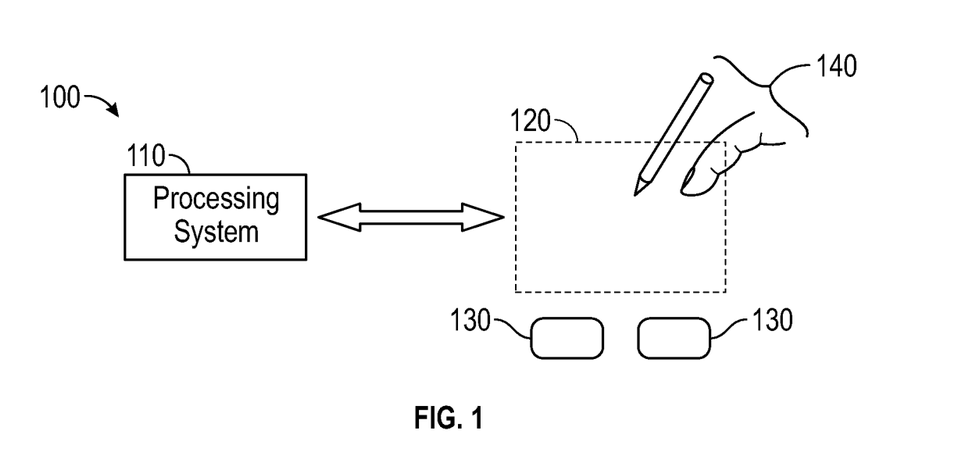
FIG. 1 is a block diagram of an exemplary electronic system that includes an input device and a processing system in accordance with an embodiment.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In a preferred embodiment, the input device 100 is implemented as a force enabled touchpad system including a processing system 110 and a sensing region 120. Sensing region 120 (also often referred to as "touchpad" or "touch sensor device") is configured to sense input provided by one or more input objects 140 in the sensing region 120. Example input objects include fingers, thumb, palm, and styli. The sensing region 120 is illustrated schematically as a rectangle; however, it should be understood that the sensing region may be of any convenient form and in any desired arrangement on the surface of and/or otherwise integrated with the touchpad.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device is adapted to provide user interface functionality by facilitating data entry responsive to the position of sensed objects and the force applied by such objects. Specifically, the processing system is configured to determine positional information for objects sensed by a sensor in the sensing region. This positional information can then be used by the system to provide a wide range of user interface functionality. Furthermore, the processing system is configured to determine force information for objects from measures of force determined by the sensor in the sensing region. This force information can then also be used by the system to provide a wide range of user interface functionality, for example, by providing different user interface functions in response to different levels of applied force by objects in the sensing region.

Furthermore, the processing system may be configured to determine input information for more than one object sensed in the sensing region. Input information can be based upon a combination the force information, the positional information, the number of input objects in the sensing region and/or in contact with the input surface, and a duration the one or more input objects is touching or in proximity to the input surface. Input information can then be used by the system to provide a wide range of user interface functionality.

The input device is sensitive to input by one or more input objects (e.g. fingers, styli, etc.), such as the position of an input object within the sensing region. The sensing region encompasses any space above, around, in and/or near the input device in which the input device is able to detect user input (e.g., user input provided by one or more input objects). The sizes, shapes, and locations of particular sensing regions may vary widely from embodiment to embodiment. In some embodiments, the sensing region extends from a surface of the input device in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device, contact with an input surface (e.g. a touch surface) of the input device, contact with an input surface of the input device coupled with some amount of applied force, and/or a combination thereof. In various embodiments, input surfaces may be provided by surfaces of casings within which the sensor electrodes reside, by face sheets applied over the sensor electrodes or any casings.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In various embodiments, the input device further comprises one or more force sensors as part of an interface for an electronic system. The input device has a processing system, an input surface, sensing region and a single or multiple force sensors implemented proximate the sensing region. Furthermore, it should be noted that one or more force sensors may be provided inside or outside the perimeter of the input surface. The input device uses both the proximity sensor and the force sensor(s) to provide an interface for an electronic system.

It should also be understood that the input device may be implemented with a variety of different methods to determine force imparted onto the input surface of the input device. For example, the input device may include mechanisms disposed proximate the input surface and configured to provide an electrical signal representative of an absolute or a change in force applied onto the input surface. In some embodiments, the input device may be configured to determine force information based on a deflection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner. In various embodiments, the force sensors may be based on changes in capacitance and/or changes in resistance.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes).

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit.

As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists).

In some embodiments, some part of the electronic system processes information received from the processing system 110 to act on user input, such as to facilitate a full range of actions, including mode changing actions and GUI actions. The types of actions may include, but are not limited to, pointing, tapping, selecting, clicking, double clicking, panning, zooming, and scrolling. Other examples of possible actions include an initiation and/or rate or speed of an action, such as a click, scroll, zoom, or pan.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Likewise, the term "force information" as used herein is intended to broadly encompass force information regardless of format. For example, the force information can be provided for each input object as a vector or scalar quantity. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

Likewise, the term "input information" as used herein is intended to broadly encompass temporal, positional and force information regardless of format, for any number of input objects. In some embodiments, input information may be determined for individual input objects. In other embodiments, input information comprises the number of input objects interacting with the input device.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110).

Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

As noted above, the embodiments of the invention can be implemented with a variety of different types and arrangements of capacitive sensor electrodes. To name several examples, the input device can be implemented with electrode arrays that are formed on multiple substrate layers, typically with the electrodes for sensing in one direction (e.g., the "X" direction) formed on a first layer, while the electrodes for sensing in a second direction (e.g., the "Y" direction are formed on a second layer. In other embodiments, the sensor electrodes for both the X and Y sensing can be formed on the same layer. In yet other embodiments, the sensor electrodes can be arranged for sensing in only one direction, e.g., in either the X or the Y direction.

In still another embodiment, the sensor electrodes can be arranged to provide positional information in polar coordinates, such as "r" and "θ" as one example. In these embodiments the sensor electrodes themselves are commonly arranged in a circle or other looped shape to provide "θ", with the shapes of individual sensor electrodes used to provide "r".

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition and etching of conductive ink on a substrate.

Figure 2:
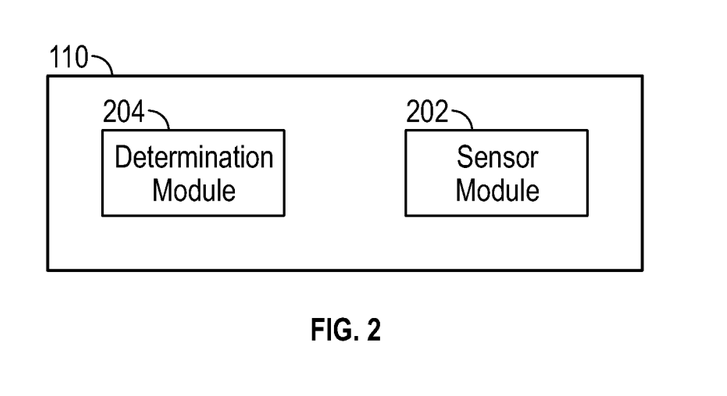
FIG. 2 is a schematic view of an exemplary processing system in accordance with an embodiment.

Referring now to FIGS. 1 and 2, the processing system 110 includes a sensor module 202 and a determination module 204. Sensor module 202 is configured to receive resulting signals from the sensor electrodes associated with sensing region 120. Determination module 204 is configured to process the data, and to determine positional information and the force information for one or more input objects in the sensing region.

Figure 3:
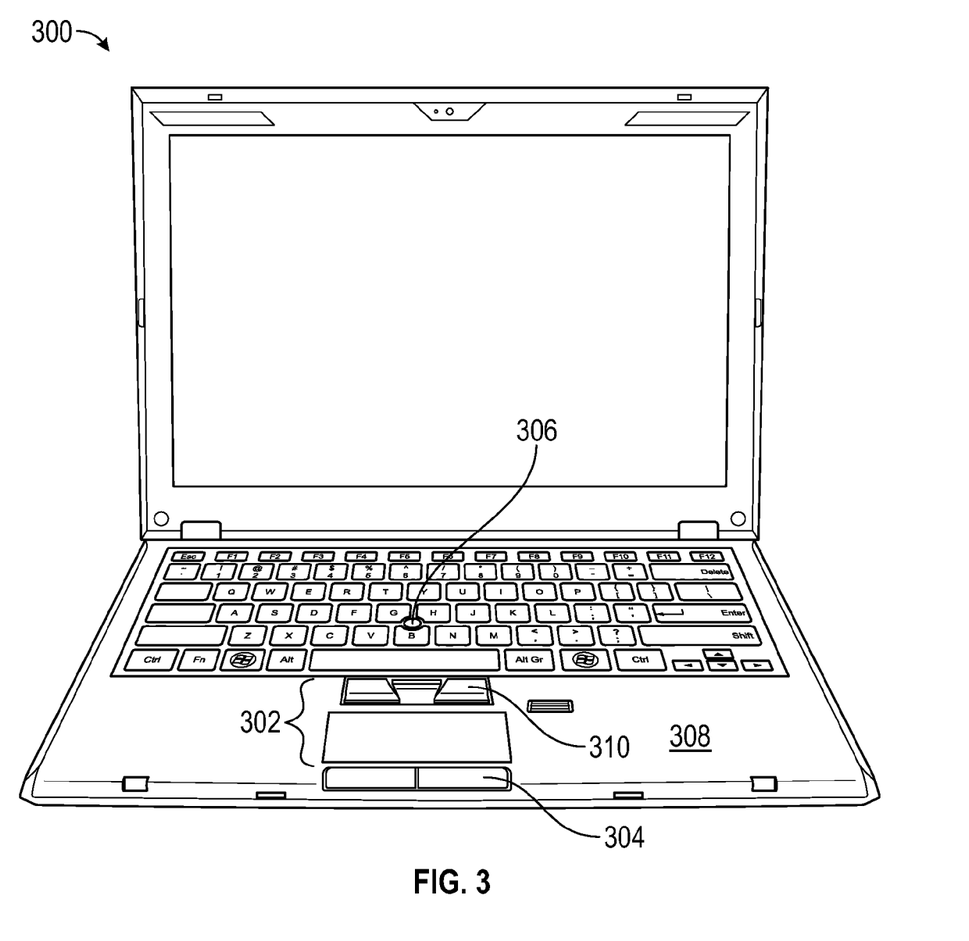
FIG. 3 is a front elevation view of a lap top computer including a click pad assembly integrated into the keyboard deck in accordance with an embodiment.

Referring now to FIG. 3, an electronic system (e.g., a lap top computer) 300 includes a click pad assembly 302 integrated into a keyboard deck 308. In the illustrated embodiment, the electronic system 300 includes an isometric pointing stick 306 and left/right buttons 304. Because of the large distance between the pointing stick 306 and left/right buttons 304, the click pad assembly 302 also includes redundant buttons 310 located closer to the pointing stick, as described in greater detail below.

Figure 4:
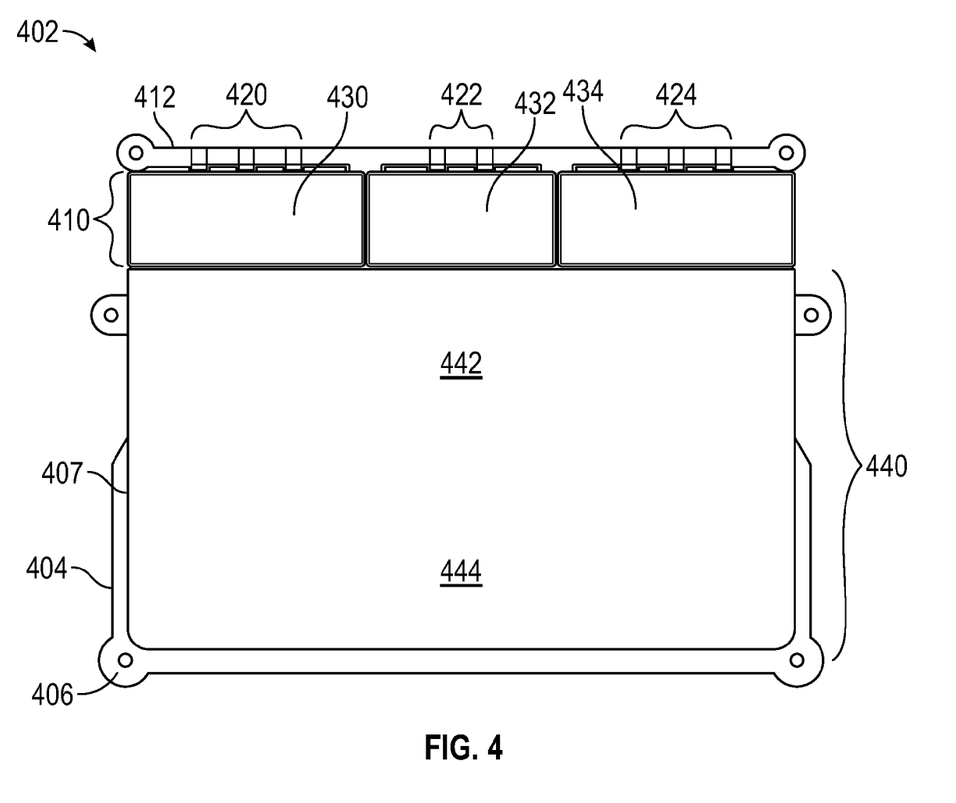
FIG. 4 is a top plan view of the click pad assembly of FIG. 3 including a two-dimensional touchpad area and a three-dimensional button area in accordance with an embodiment.

FIG. 4 is a top view of a click pad assembly 402 including a bracket 404 having a plurality of mounting holes 406 for securing the assembly to a chassis of an electronic system. The click pad assembly 402 also includes a two-dimensional touchpad area 440 comprising an upper "touch only" zone 442 (above a step 407 in bracket 404), and a lower button click zone 444 (below the step 407 and generally analogous to the left/right buttons 304 of FIG. 3). The click pad assembly 402 also includes a button area 410 including a first button 430, a second button 432, and a third button 434. The button area 410, as described in greater detail below, comprises an underlying sensor substrate permitting two-dimensional (X-Y) sensing of positional information across the surface of the buttons 430-434, as well as detecting a button click in the Z direction. As also described in greater detail below in connection with FIGS. 5, 6, and 8, the underlying sensor substrate includes flexible hinges 420, 422, and 424 which wrap around an upper support bar 412 of bracket 404.

Figure 5:
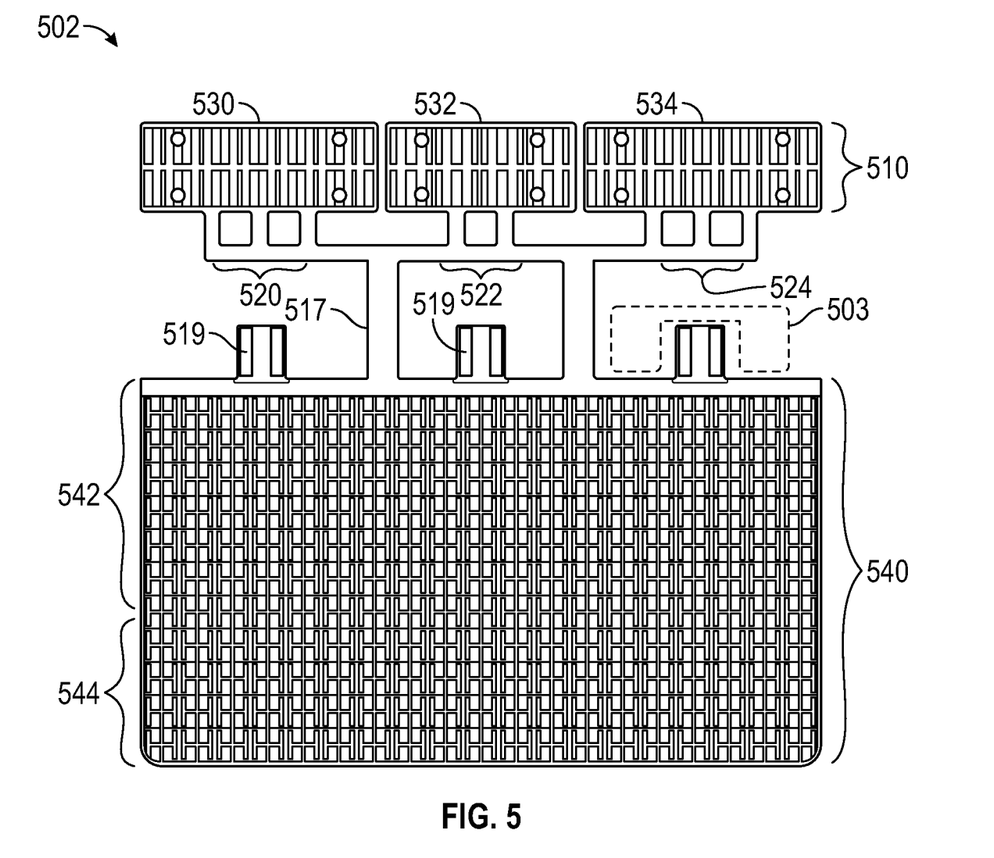
FIG. 5 is a top plan view of a contiguous planar capacitive sensor substrate having a two-dimensional touch pad region, a two-dimensional button region connected to the touch pad region by flexible ribs, and a one-dimensional button click region in accordance with an embodiment.

Referring now to FIG. 5, a capacitive sensor substrate 502 comprises a first segment 540, a second segment 510 connected to the first segment by ribs 517, and a third segment comprising tabs 519. The first segment 540 and the second segment 510 include a two dimensional array of capacitive sensing electrodes which, when communicatively coupled to a processing system, facilitate the determination of two-dimensional positional information for input objects. The tabs 519 also include one or more sensor electrodes which, when communicatively coupled to the processing system, facilitate the determination of a button click.

With continued reference to FIG. 5, the second segment 510 comprises button segments 530, 532, and 534 connected to the first segment 540 via respective flexible hinges 520, 522, and 524 (generally analogous to the flexible hinges 420-424 of FIG. 4). By folding the flexible hinges over the upper support bar 412 of bracket 404, each button segment 530-534 may be aligned with a tab 519. In the fully assembled configuration shown in FIG. 4, this arrangement allows the button segments 530-534 to determine positional information for input objects interacting with the buttons 430-434. At the same time, the tabs 519 may be configured to detect button clicks when an input object applies force to the buttons 430-434.

Figure 6:
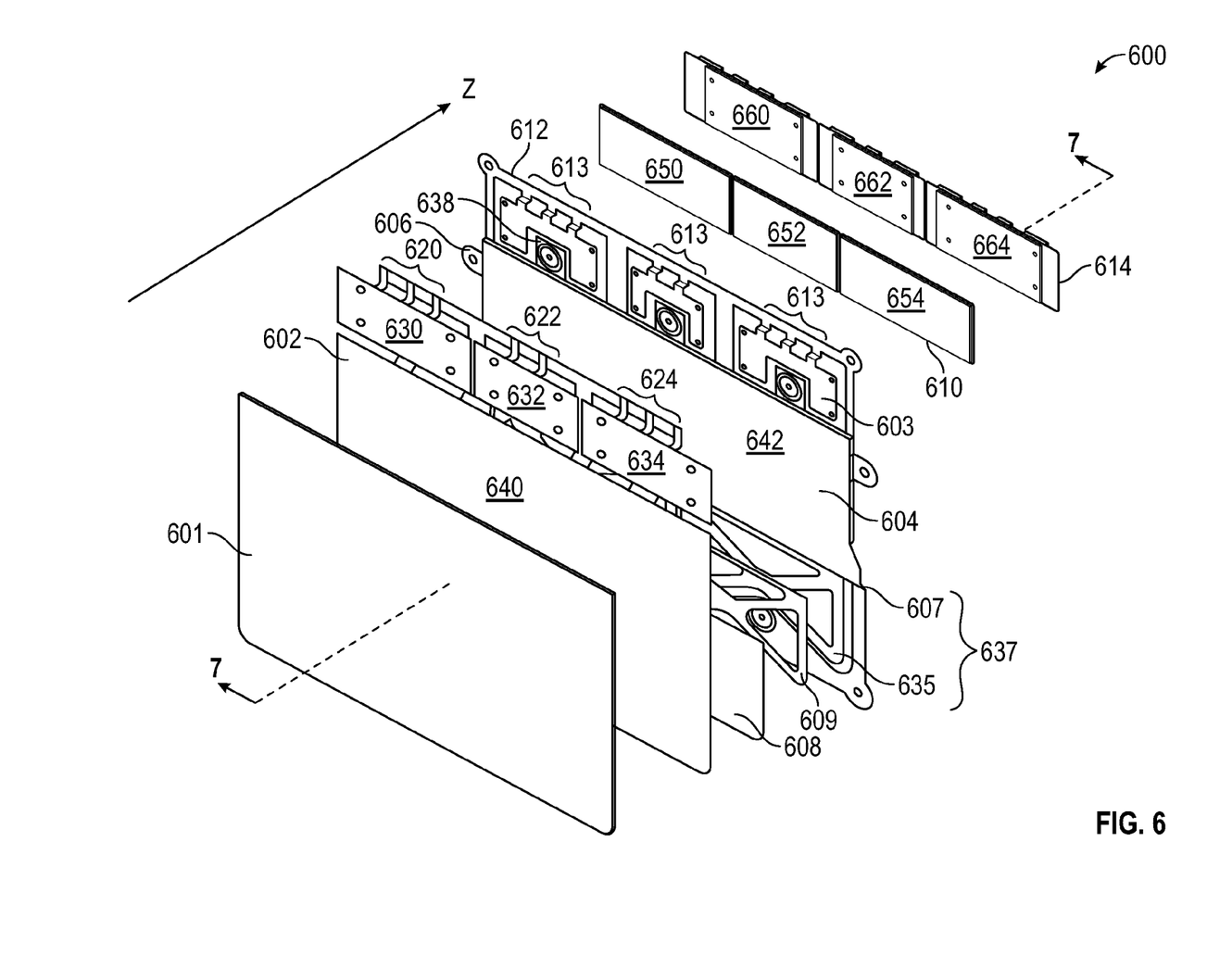
FIG. 6 is an exploded view of the click pad assembly of FIG. 4 showing the sensor substrate of FIG. 5 in the folded over position in accordance with an embodiment.

FIG. 6 is an exploded view of a click pad assembly 600 comprising a face sheet 601, a sensor substrate 602, a support bracket 604, a control board 608, a front button cap 610, and a back button cap 614. Face sheet 601 may be composed of Mylar, and may be adhesively secured to a two-dimensional sensing area 640 of the sensor substrate 602. Sensor substrate 602 comprises button segments 630, 632, and 634 (generally analogous to button segments 530-534 of FIG. 5) connected to flexible hinges 620, 622, and 624 (generally analogous to flexible hinges 520-524 of FIG. 5). Front button cap 610 includes front caps 650, 652, and 654, and back button cap 614 includes back caps 660, 662, and 664.

Bracket 604 includes a first area 642 which generally aligns with the upper "touch only" zone 442 of two-dimensional touchpad area 440 (See FIG. 4), an embossed step 607, and a recessed area 637 which is generally parallel to and spaced downwardly (in the Z direction) from the first area 642. The recessed area 637 includes one or more spring features 635 corresponding to one or more lower buttons associated with the lower button click zone 444 shown in FIG. 4. An adhesive layer 609 secures the control board 608 to the spring features 635, allowing the one or more buttons comprising the lower button click zone 444 to deflect downwardly (in the Z direction) into the recessed area 637 in response to force applied by an input object. One or more snap domes, tact switches, or the like may be disposed between the control board 608 and the bracket 604 to detect button presses in the lower button click zone 444.

With continued reference to FIG. 6, bracket 604 further includes an upper support bar 612. A plurality (three in the illustrated embodiment) of horseshoe shaped features 603 extend from the upper support bar 612 via resiliently deformable hinges 613. Respective metal domes 638 extend from the upper zone 442 of bracket 604, with each dome being flanked by (but not touching) a horseshoe feature 603. When fully assembled, the foregoing elements combine to form the buttons 430, 432, and 434 shown in FIG. 4.

More particularly and referring now to FIGS. 4 and 6, button 430 comprises, from left to right (front to back) in the direction indicated by the "Z" arrow: front cap 650, sensor button segment 630, horseshoe feature 613 and snap dome 638, and back cap 660. Similarly, button 432 comprises front cap 652, sensor button segment 632, horseshoe feature 613 and snap dome 638, and back cap 662. Button 434 comprises front cap 654, sensor button segment 634, horseshoe feature 613 and snap dome 638, and back cap 664.

Figure 7:
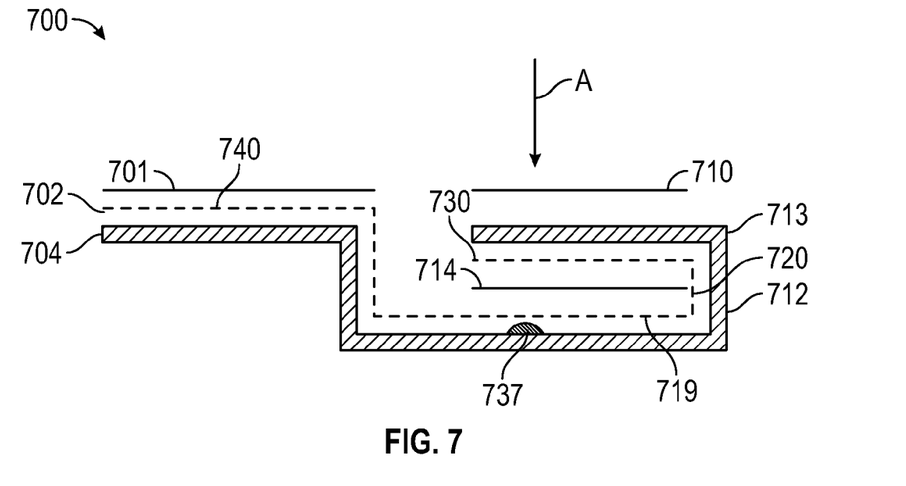
FIG. 7 is a cross-section view of the click pad assembly taken along line VII-VII of FIG. 6 shown in the fully assembled condition in accordance with an embodiment.

FIG. 7 is a cross-section view, taken along line VII-VII of FIG. 6, of a click pad assembly 700 shown in the fully assembled condition in accordance with an embodiment. More particularly, click pad assembly 700 comprises a face sheet 701, a bracket 704 supporting a sensor substrate 702, a front button cap 710, a rear button cap 714, and a snap dome 737. The bracket 704 comprises an upper support bar 712 and a resiliently deformable spring or hinge portion 713 from which a horseshoe feature 703 extends. The sensor substrate 702 comprises a two-dimensional touch sensing area 740, and a two dimensional button sensing area 730 folded over and aligned with a button click sensing area 719 (generally corresponding to tab(s) 519 of FIG. 5). A flexible hinge portion 720 allows the sensing area 703 to be manipulated during assembly to be sandwiched (along with the horseshoe feature 703) between the front button cap 710 rear button cap 714. In response to force applied by an input object in the direction generally indicated by arrow A, the horseshoe feature 703 deflects at hinge 713, causing the button click sensing area 719 to engage (e.g., transcapacitively and/or ohmically) the snap dome 737 to detect a button click. One or both of the hinge 713 and the snap dome 737 provides the restoring force.

Figure 8:
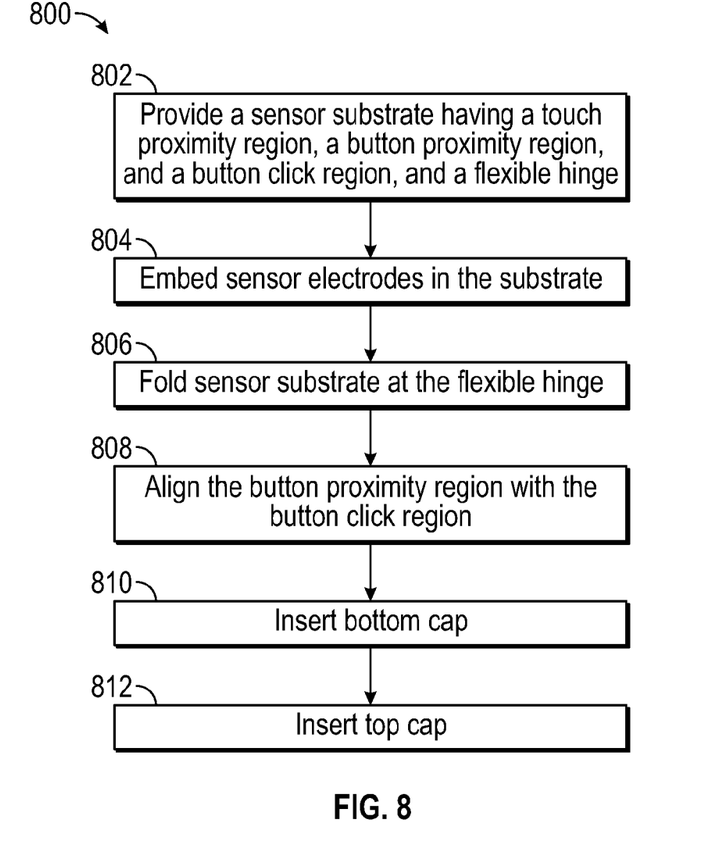
FIG. 8 is a flow chart illustrating an exemplary method of making a click pad assembly in accordance with an embodiment.

FIG. 8 is a flow chart illustrating an exemplary method 800 of making a click pad assembly in accordance with various embodiments. More particularly, the method 800 includes providing (Task 802) a planar sensor substrate having a first region, a tab adjacent to the first region, a third region spaced apart from the first region, and a flexible rib connecting the first and third regions, and disposing (Task 804) a plurality of sensor electrodes on the sensor substrate. In an embodiment, the sensor substrate may be made from a single, contiguous sheet of material having interconnected electrodes, thereby reducing the cost otherwise associated with providing separate sensor substrates for each sensing region.

With continued reference to FIG. 8, the method 800 further includes folding (Task 806) the third region over the tab by bending the flexible rib, and aligning (Task 808) the third region over the tab. A bottom button cap may then be inserted (Task 810) between the third region and the tab. Finally, a top button cap may be disposed (Task 812) on top of the third region, such that the third region is disposed between the top and bottom button caps, creating an integrated button assembly.

A sensor substrate is thus provided for use with an input device of an electronic system. The sensor substrate includes a plurality of sensor electrodes disposed on the sensor substrate; a first segment for use with a touch pad area of the input device; and a second segment for use with a button area of the input device; wherein the touch pad area and the button area do not overlap, and further wherein the first and second segments comprise a single, contiguous sheet of material.

In an embodiment, the sensor substrate further includes: a third segment for use with the button area of the input device; wherein the first, second, and third segments comprise a single, contiguous sheet of material.

In an embodiment, the sensor substrate further includes a processing system communicatively coupled to the plurality of sensor electrodes and configured to: determine positional information for an input object interacting with one of the first segment and the second segment.

In an embodiment, the processing system is further configured to determine one-dimensional positional information for the input object interacting with the second segment.

In an embodiment, the processing system is further configured to determine deflection of the second segment relative to the third segment based on a variable capacitance on at least one sensor electrode disposed in the third segment.

In an embodiment, the sensor substrate comprises a polyethylene terephthalate (PET) substrate.

In an embodiment, the sensor substrate is manufactured in the form of a thin planar sheet.

In an embodiment, the third segment is spaced apart from the first segment, and the sensor substrate further comprises at least one flexible rib interconnecting the first and third segments.

In an embodiment, the second segment is substantially contiguous with the first segment.

A method of manufacturing an input device is also provided for use with an electronic system. The method includes providing a planar sensor substrate having a first region, a tab adjacent to the first region, a third region spaced apart from the first region, and a flexible rib connecting the first and third regions; disposing a plurality of sensor electrodes on the sensor substrate; folding the third region over the tab by bending the flexible rib; aligning the third region to substantially overlap the tab; and inserting a first button component between the third region and the tab.

In an embodiment, the method also includes communicatively coupling a processing system with the plurality of sensor electrodes, and configuring the processing system to: operate the first region as a two-dimensional proximity sensing region; operate the third region as a two-dimensional proximity sensing region associated with the first button component; and operate the tab as a click sensor for the first button component.

In an embodiment, the method further includes: attaching a face sheet to the first region to create an input surface configured to sense two-dimensional positional information of an input object interacting with the input surface; attaching a cap to the folded over third region to thereby create a button surface configured to sense two-dimensional positional information of an input object interacting with the button surface; and attaching a metal dome proximate the tab to sense a button press.

In an embodiment, the method further includes: providing a bracket having a frame, a planar middle region, a lower region recessed downwardly relative to the middle region and including a spring, and an upper region comprising a hinged element configured to deflect relative to the frame; securing a first portion of the first region of the sensor substrate to the planar middle region of the bracket, such that a second portion of the sensor substrate overhangs the recessed middle region of the bracket; disposing a control board between the second portion and the spring; and attaching the third region of the sensor substrate to the hinged element.

An input device is also provided for use with an electronic system, the input device including: a sensor substrate comprising a plurality of sensor electrodes, a first segment for use with a touch pad area of the input device, a second segment for use with a button area of the input device, and a third segment for use with the button area of the input device, wherein the first, second, and third segments comprise a single sheet of material; and a bracket having a frame, a planar middle region secured to a top portion of the first segment, a lower region recessed downwardly relative to the middle region and including a spring, and an upper region comprising: i) a hinged element secured to the third segment and configured to deflect relative to the frame; and ii) a switch disposed proximate the second segment.

In an embodiment, the input device further comprises a button cap and a button base, wherein the third segment and the hinged element are disposed between the button cap and the button base.

In an embodiment, the input device further includes a face sheet adhesively secured to the first segment of the sensor substrate.

In an embodiment, the bracket frame comprises at least one screw hole for securing the input device within a chassis of the electronic system.

In an embodiment, the switch is configured to provide a restoring force responsive to pressure applied by an input object to the button cap, and the spring is configured to provide a restoring force responsive to pressure applied by the input object to a lower portion of the face sheet.

In an embodiment, the face sheet comprises Mylar, and the sensor substrate comprises capacitive sensing electrodes in a polyethylene terephthalate (PET) substrate.

In an embodiment, the sensor substrate further comprises at least one flexible rib interconnecting the first and third segments, and further wherein the second segment is substantially contiguous with the first segment.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Other embodiments, uses, and advantages of the invention will be apparent to those skilled in art from the specification and the practice of the disclosed invention.

What is claimed is:

1. A sensor substrate for use with an input device of an electronic system, the sensor substrate comprising:
   a plurality of sensor electrodes disposed on the sensor substrate;
   a first segment for use with a touch pad area of the input device; and
   a second segment for use with a button area of the input device;
   a third segment for use with the button area of the input device and comprising a tab,
   wherein:
      the touch pad area and the button area do not overlap,
      the sensor substrate comprises a single sheet of material,
      the second segment is folded over the tab of the third segment by bending a flexible hinge coupled to the second segment,
      the tab is configured to detect a button click when an input option applies a force to the button area,
      the button area is configured to facilitate two-dimensional positional touch sensing in the button area based on a first position of an input object relative to the button area, and
      the touch pad area is configured to facilitate two-dimensional positional touch sensing in the touch pad area based on a second position of the input object relative to the touch pad area.

2. The sensor substrate of claim 1, wherein a processing system coupled to the plurality of sensor electrodes is configured to:
   determine two-dimensional positional information for the input object interacting with one of the first segment and the second segment.

3. The sensor substrate of claim 2, wherein the processing system coupled to the plurality of sensor electrodes disposed on the sensor substrate is further configured to:
   determine one-dimensional positional information for the input object interacting with the second segment.

4. The sensor substrate of claim 2, wherein the processing system coupled to the plurality of sensor electrodes disposed on the sensor substrate is further configured to:
   determine deflection of the second segment relative to the third segment of the sensor substrate based on a variable capacitance on at least one sensor electrode disposed in the third segment.

5. The sensor substrate of claim 1, wherein the sensor substrate comprises a polyethylene terephthalate (PET) substrate.

6. The sensor substrate of claim 1, wherein the second segment is spaced apart from the first segment, and the sensor substrate further comprises at least one flexible rib interconnecting the first and second segments.

7. A method of manufacturing an input device for use with an electronic system, comprising:
   providing a planar sensor substrate having a first region, a tab adjacent to the first region, a third region spaced apart from the first region, and a flexible rib connecting the first and third regions;
   disposing a plurality of sensor electrodes on the sensor substrate;
   folding the third region over the tab by bending a flexible hinge coupled to the third region;
   aligning the third region to substantially overlap the tab;
   inserting a first button component between the third region and the tab;
   communicatively coupling a processing system with the plurality of sensor electrodes;
   configuring the processing system to:
      operate the first region as a two-dimensional proximity touch sensing region;
      operate the third region as a two-dimensional proximity touch sensing region associated with the first button component; and
      operate the tab as a click sensor for the first button component.

8. The method of claim 7, further comprising:
   attaching a face sheet to the first region to create an input surface configured to sense two-dimensional positional information of an input object interacting with the input surface;
   attaching a cap to the folded over third region to thereby create a button surface configured to sense two-dimensional positional information of an input object interacting with the button surface; and
   attaching a metal dome proximate the tab to sense a button press.

9. The method of claim 8, further comprising:
   providing a bracket having a frame, a planar middle region, a lower region recessed downwardly relative to the middle region and including a spring, and an upper region comprising a hinged element configured to deflect relative to the frame;
   securing a first portion of the first region of the sensor substrate to the planar middle region of the bracket, such that a second portion of the sensor substrate overhangs the recessed lower region of the bracket;
   disposing a control board between the second portion and the spring; and
   attaching the third region of the sensor substrate to the hinged element.

10. An input device for use with an electronic system, the input device comprising:
   a sensor substrate comprising a plurality of sensor electrodes, a first segment for use with a touch pad area of the input device, a second segment for use with a button area of the input device, and a third segment for use with the button area of the input device, wherein the first, second, and third segments comprise a same single sheet of material, wherein:
      the third segment is folded over the second segment by bending a flexible hinge coupled to the third segment,
      the button area is configured to facilitate two-dimensional positional touch sensing in the button area based on a first position of an input object relative to the button area, and the touch pad area is configured to facilitate two-dimensional positional touch sensing in the touch pad area based on a second position of the input object relative to the touch pad area; and a bracket having a frame, a planar middle region secured to a top portion of the first segment, a lower region recessed downwardly relative to the middle region and including a spring, and an upper region comprising: i) the flexible hinge secured to the third segment and configured to deflect relative to the frame; and ii) a switch disposed proximate the second segment.

11. The input device of claim 10, further comprising:
a button cap and a button base, wherein the third segment and the hinged element are disposed between the button cap and the button base.

12. The input device of claim 10, further comprising:
a face sheet adhesively secured to the first segment of the sensor substrate.

13. The input device of claim 12, wherein the switch is configured to provide a restoring force responsive to pressure applied by an input object to the button cap, and the spring is configured to provide a restoring force responsive to pressure applied by the input object to a lower portion of the face sheet.

14. The input device of claim 12, wherein the face sheet comprises mylar, and the sensor substrate comprises capacitive sensing electrodes in a polyethylene terephthalate (PET) substrate.

15. The input device of claim 10, wherein the bracket frame comprises at least one screw hole for securing the input device within a chassis of the electronic system.

16. The input device of claim 10, wherein the sensor substrate further comprises at least one flexible rib interconnecting the first and third segments.

* * * * *